(12) United States Patent
Wiik et al.

(10) Patent No.: US 10,845,493 B2
(45) Date of Patent: Nov. 24, 2020

(54) MODEL COMPRESSION

(71) Applicant: Statoil Petroleum AS, Stavanger (NO)

(72) Inventors: Torgeir Wiik, Ås (NO); Janniche Iren Nordskag, Buvika (NO); Anh Kiet Nguyen, Trondheim (NO); Emmanuel Causse, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 307 days.

(21) Appl. No.: 15/572,433

(22) PCT Filed: May 8, 2015

(86) PCT No.: PCT/EP2015/060265
§ 371 (c)(1),
(2) Date: Nov. 7, 2017

(87) PCT Pub. No.: WO2016/180457
PCT Pub. Date: Nov. 17, 2016

(65) Prior Publication Data
US 2018/0136349 A1    May 17, 2018

(51) Int. Cl.
*G01V 1/28* (2006.01)
*G01V 3/08* (2006.01)
*G01V 99/00* (2009.01)

(52) U.S. Cl.
CPC .............. *G01V 1/282* (2013.01); *G01V 3/083* (2013.01); *G01V 99/005* (2013.01); *G01V 2210/66* (2013.01)

(58) Field of Classification Search
CPC .................. G01V 1/282; G01V 2210/66
See application file for complete search history.

(56) References Cited

U.S. PATENT DOCUMENTS

| | | | |
|---|---|---|---|
| 2006/0095239 A1* | 5/2006 | Frenkel | G01V 1/40 703/5 |
| 2008/0270028 A1* | 10/2008 | Abubakar | G01V 3/083 702/2 |

(Continued)

FOREIGN PATENT DOCUMENTS

| | | |
|---|---|---|
| CN | 103329008 A | 9/2013 |
| WO | WO 2012/064839 A2 | 5/2012 |

OTHER PUBLICATIONS

Abubakar, A model-compression scheme for nonlinear electromagnetic inversions, Geophysics, vol. 77, No. 5 (Sep.-Oct. 2012); p. E379-E389 (Year: 2012).*

(Continued)

*Primary Examiner* — Michael J Dalbo
(74) *Attorney, Agent, or Firm* — Birch, Stewart, Kolasch & Birch LLP

(57) ABSTRACT

A method of estimating a set of physical parameters, the method comprising iteratively inverting an equation to minimise an error between simulated data and measured data and to provide an estimated set of physical parameters, wherein said iteratively inverting comprises at least a first inversion step and a second inversion step and wherein the simulated data depend on a model vector representing the set of physical parameters, applying a compression operator to the model vector representing the set of physical parameters to reduce the number of free variables and to produce a compressed model vector and varying the compression operator between the first inversion step and the second inversion step.

11 Claims, 6 Drawing Sheets

$m_2$

Figure 1:
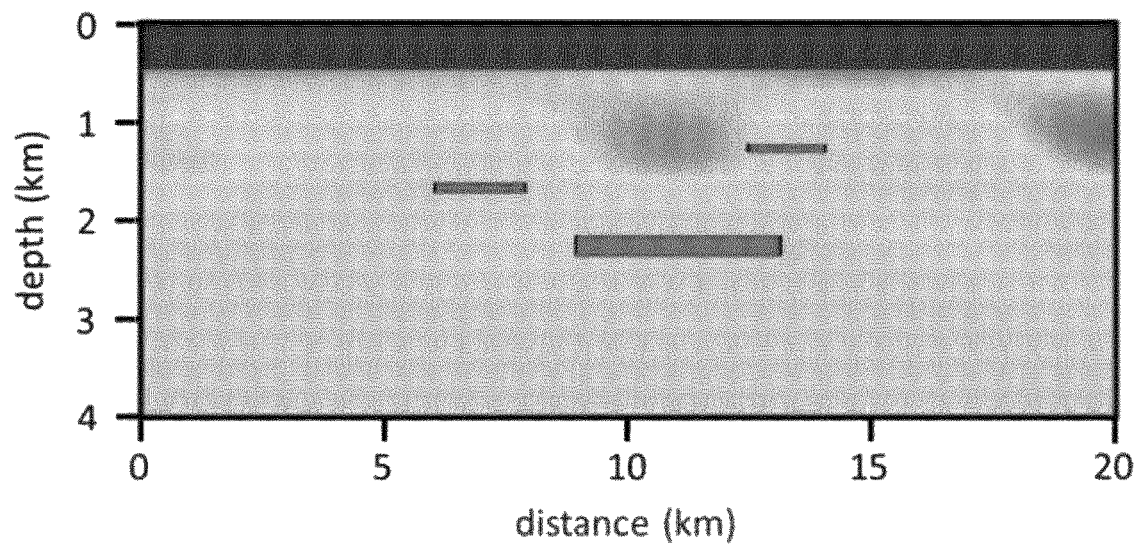

A $\Delta m_2 = R_2 \Delta \tilde{m}_2$

B $m_3 = m_2 + \Delta m_2$

C

(56) References Cited

U.S. PATENT DOCUMENTS

| | | | | |
|---|---|---|---|---|
| 2009/0120634 A1* | 5/2009 | Liu | ............... | G01V 1/303 |
| | | | | 166/250.01 |
| 2010/0018718 A1* | 1/2010 | Krebs | ............... | G01V 1/28 |
| | | | | 166/369 |
| 2011/0246140 A1 | 10/2011 | Abubakar et al. | | |
| 2011/0307438 A1* | 12/2011 | Fernandez Martinez | ............... | |
| | | | | G06N 7/005 |
| | | | | 706/52 |
| 2012/0121179 A1* | 5/2012 | Keshet | ............... | G06T 5/002 |
| | | | | 382/169 |
| 2013/0185033 A1 | 7/2013 | Tompkins et al. | | |
| 2014/0350859 A1 | 11/2014 | Lin et al. | | |
| 2015/0039231 A1 | 2/2015 | Celepcikay et al. | | |

OTHER PUBLICATIONS

Abubakar et al., "A Model-compression Scheme for Nonlinear Electromagnetic Inversions," Geophysics, vol. 77, No. 5, Sep.-Oct. 2012 (Sep. 1, 2012), pp. E379-E389 (12 Total Pages), XP001578941.

Krebs et al., "Fast Full-wavefield Seismic Inversion Using Encoded Sources," Geophysics, vol. 74, No. 6, Nov.-Dec. 2009 (Nov. 1, 2009), pp. WCC177-WCC188, XP001550489.

Written Opinion of the International Searching Authority and International Search Report (forms PCT/ISA/237 and PCT/ISA/210), dated Feb. 10, 2016, for International Application No. PCT/EP2015/060265.

English translation of the Chinese Office Action and Search Report for Chinese Application No. 201580081147.0, dated Apr. 8, 2019.

Vesnaver et al., "Staggered or adapted grids for seismic tomography?," The Leading Edge, Sep. 2000, 4 pages total.

* cited by examiner

MODEL COMPRESSION

The present invention relates to linear and non-linear inversion of physical data and more specifically but not limited to controlled-source electromagnetic (CSEM) data or seismic data.

A number of techniques for exploring the Earth's subsurface have been developed that are based on transmitting waves or signals into a region of the Earth's subsurface. The transmitted signal interacts with the earth and typically a portion of the signal propagates back to the surface where it is recorded and used to obtain information about the subsurface structure, based on how the signal has interacted with the earth. The CSEM method may use, for example, a dipole source which is towed above the seafloor for transmitting an electromagnetic signal and an array of receivers placed on the seabed for detecting the signal which has traveled through the formation below the seafloor. The detected signal then needs to be inverted for deriving physical parameters. The physical parameters could optionally be used to estimate the presence of hydrocarbons or water. A physical parameter which is typically derived is conductivity of the formation. The conductivity can be used as a parameter in a simulation capable of producing a simulation of the recorded data. The optimal values for the conductivities are those which optimise the agreement between the simulated data and the data.

Non-linear inversion of CSEM data involves solving a large linear system of equations to calculate updated values of the conductivity at each iteration of an iterative optimisation method in order to minimise the distance between the data and the simulated data. The number of nodes of a spatial three dimensional grid on which the model vector is based typically exceeds a million, and solving the large system of equations on that grid becomes unfeasible or at least numerically costly. Optimization algorithms which do not require solving the large system of equations, solve it only approximately, or solve a simplified version of the original system of equations, like the limited-memory Broyden-Fletcher-Goldfarb-Shanno algorithm can be used, but they require very accurate start model vectors to deliver good inversion results. Reducing the number of inversion parameters, also called free parameters, is an important way of increasing the efficiency of the inversion algorithm: with fewer parameters the linear system of equations becomes much smaller and solving the normal equations can become feasible or much less computer intensive/numerically costly.

Strong geometrical constraints may be used to reduce the number of independent free parameters. For example, the conductivity values in geologically defined bodies can be set to constant values and those constant values are then inverted. However, a disadvantage of such methods is that they require much a priori information and are not suitable when resistive or conductive bodies stretch across the defined geometrical structures.

STATEMENT OF INVENTION

According to a first aspect of the invention, there is provided a method of estimating a set of physical parameters, the method comprising iteratively inverting an equation to minimise a penalty term depending on simulated data and measured data and to provide an estimated set of physical parameters, wherein said iteratively inverting comprises at least a first inversion step and a second inversion step and wherein the simulated data depend on a model vector representing the set of physical parameters, applying a compression operator to the model vector representing the set of physical parameters to reduce the number of free variables and to produce a compressed model vector and varying the compression operator between the first inversion step and the second inversion step.

The method may further comprise calculating a combination of a compressed model vector obtained in the first inversion step and a compressed model vector obtained in the second inversion step. In particular, the model vector may be defined on grid and the compression operator may be arranged to reduce the number of free parameters defined on the grid.

The compression operator may be a nearest-neighbour interpolator arranged to interpolate the value of the physical parameters on neighbouring cells of the grid. Additionally, smoothing may be used for the interpolated values.

The equation may be a normal equation in a Gauss-Newton method. The inversion may also be based on an OCCAM algorithm, an Levenberg-Marquardt algorithm, a quasi-Newton algorithm or a gradient-base algorithm The measured data may be CSEM data or seismic data. The grid could be uniform or non-uniform.

The physical parameters may relate to a formation and the grid may depend on prior knowledge of the formation. Varying the compression operator between the first inversion step and the second inversion step may shift the free parameters between the first inversion step and the second inversion step.

The penalty term may be one of: the error between the simulated data and the measured data, a cost function depending on the simulated data and the measured data, the sum or the product of (i) the error between the simulated data and the measured data and (ii) the simulated data weighted according to a predetermined preference According to a second aspect of the invention, there is provided a computer system arranged to carry out the method of the first aspect of the invention.

According to a third aspect of the invention, there is provided computer software which, when installed on the computer system of the second aspect, is arranged to cause the computer system to carry out the method of the first aspect.

FIGURES

Figure 2:
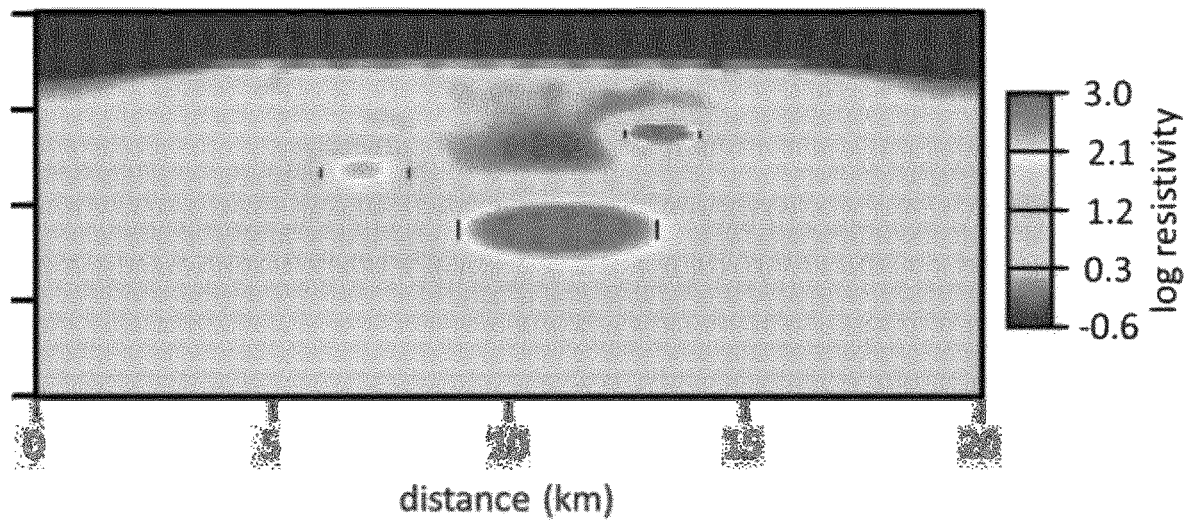
Figure 3:
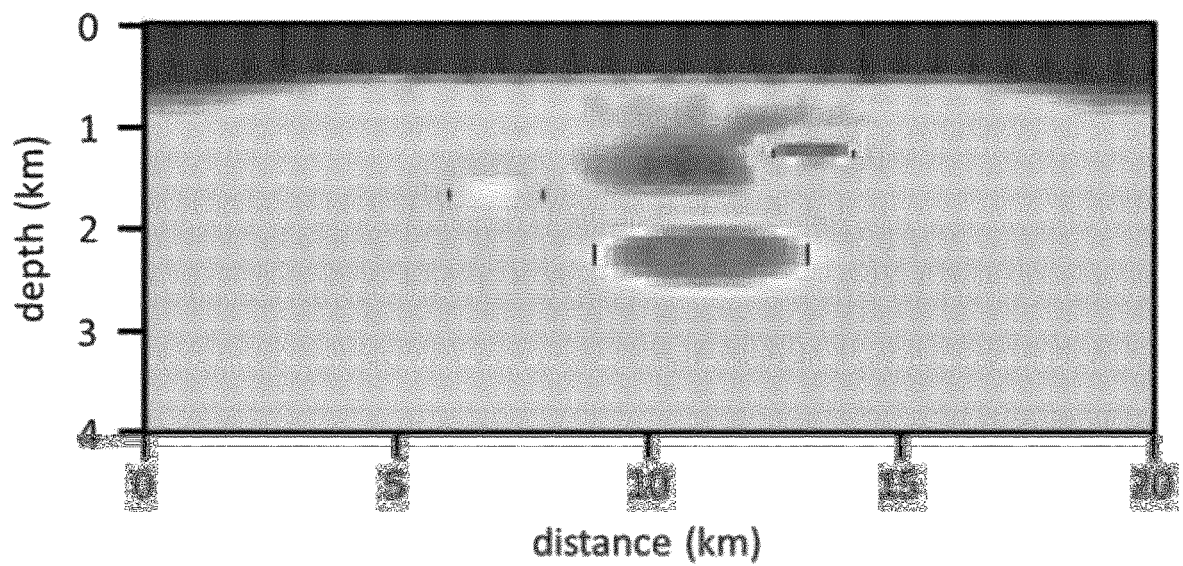
Figure 4:
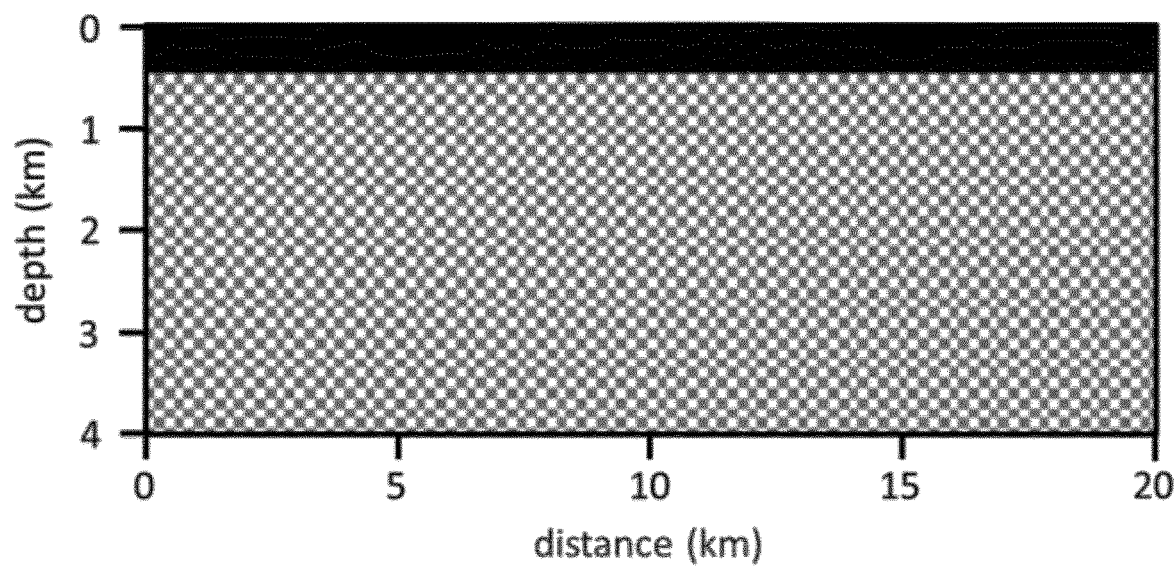
Figure 5:
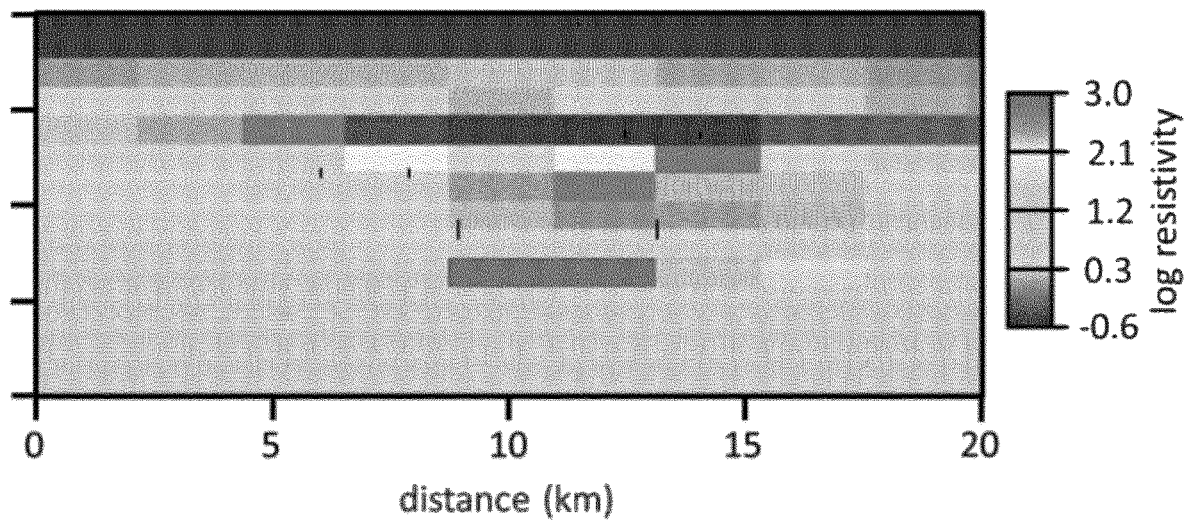
Figure 6:
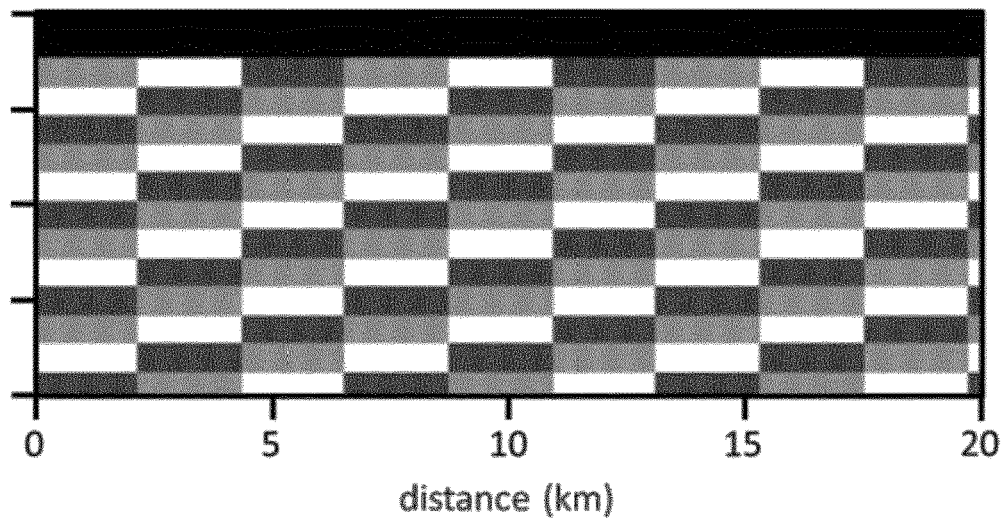
Figure 7:
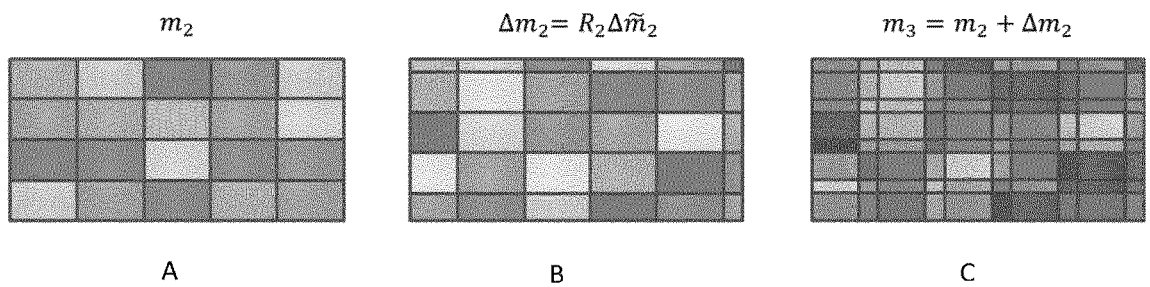
Figure 8:
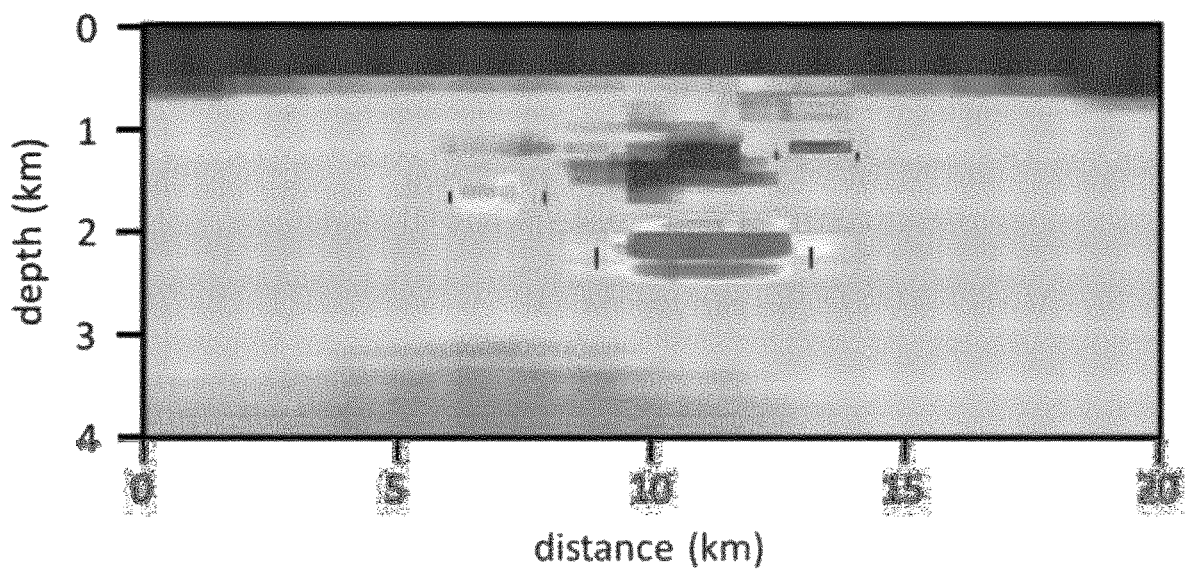
Figure 9:
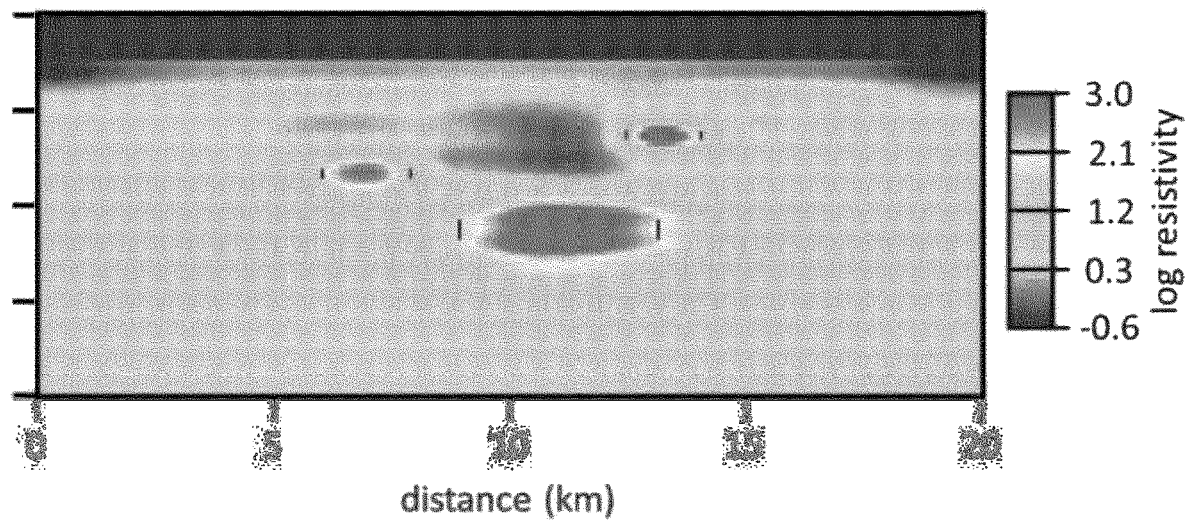
Figure 10:
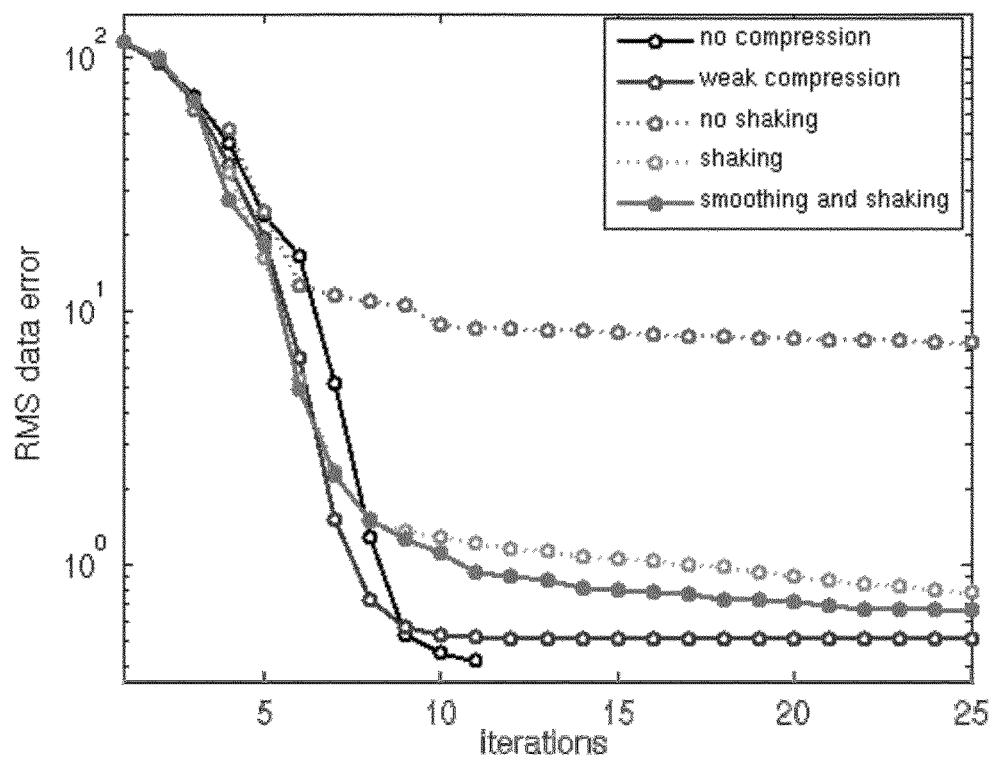
Figure 11:
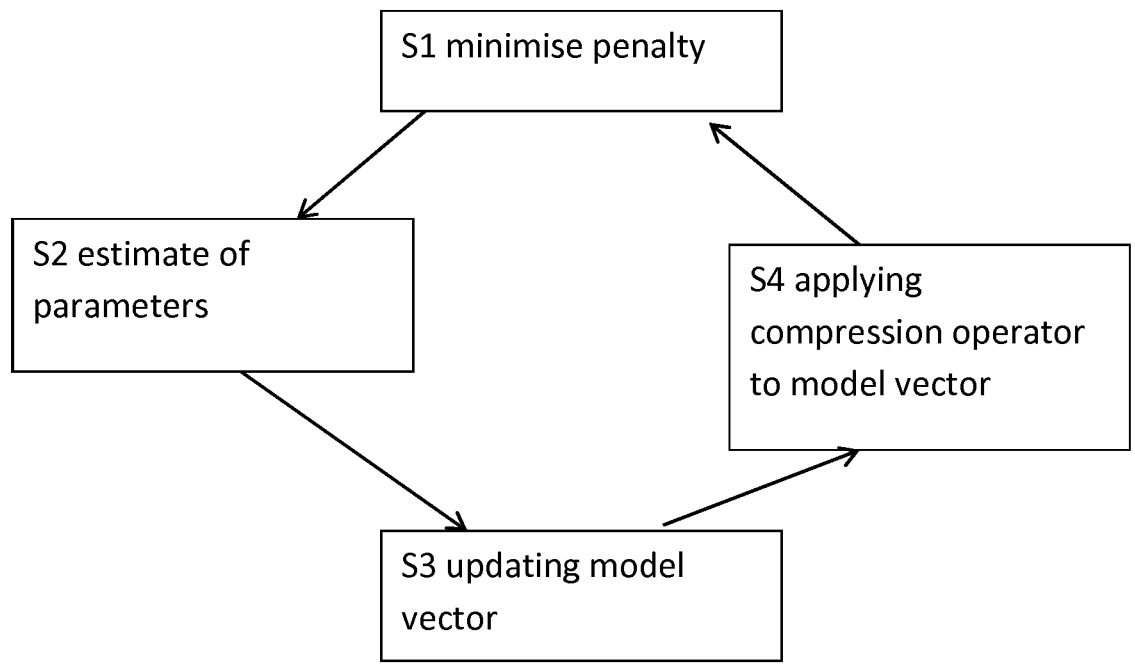

Some embodiments of the invention will now be described by way of example only and with reference to the accompanying drawings, in which:

FIG. 1 illustrates a physical characteristic of a formation;
FIG. 2 illustrates an estimation of a physical characteristic of a formation;
FIG. 3 illustrates an estimation of a physical characteristic of a formation;
FIG. 4 illustrates a grid on which a model is defined;
FIG. 5 illustrates an estimation of a physical characteristic of a formation;
FIG. 6 illustrates a grid on which a model is defined;
FIG. 7 illustrates a method of shifting a grid;
FIG. 8 illustrates an estimation of a physical characteristic of a formation;
FIG. 9 illustrates an estimation of a physical characteristic of a formation;
FIG. 10 illustrates the performance of different methods;
FIG. 11 is a flow diagram.

SPECIFIC DESCRIPTION

As illustrated in FIG. 11, a method is provided which estimates a set of physical parameters, the method comprises iteratively inverting an equation to minimise a penalty term (S1) depending on simulated data and measured data and to provide an estimated set of physical parameters (S2), wherein said iteratively inverting comprises at least a first inversion step and a second inversion step wherein a model vector is updated (S3) and wherein the simulated data depend on the model vector representing the set of physical parameters, applying a compression operator to the model vector (S4) representing the set of physical parameters to reduce the number of free variables and to produce a compressed model vector, and varying the compression operator between the first inversion step and the second inversion step.

The inventors have appreciated that the model vector can be compressed, followed by a technique that is referred to herein as grid shaking. A model vector m is defined which contains the values of horizontal and vertical conductivity in cell of the grid. The model vector m contains the free parameters which can be varied during the inversion process in order to find the vector m which minimises the distance between measured values and simulated values of, for example, the electric field amplitudes. The grid may be defined on the basis of depth and distance within a geographical formation when a 2 dimensional representation is used, or may also be defined on the basis of the three spatial dimensions of the formation when a 3 dimensional representation is used. The proposed model contains N parameters. In the specific embodiment presented below, the invention is illustrated using the Gauss-Newton algorithm, but the invention can also be used in other algorithms. The data Jabobian is (equation 1)

$J=\partial d/\partial m,$ where d represents the CSEM data weighted by the inverse of the data uncertainty. The size of the data vector is $N_d$. In order to obtain the Gauss-Newton search direction p, one must solve the normal equations (equation 2)

$J^*Jp=-g,$ wherein the gradient g is given by (equation 3)

$g=J^*\Delta d,$ with $\Delta d$ the weighted data residuals and the star (*) indicates the conjugate transpose. Additional regularisation terms, which are often included in this type of inversion problem, are omitted for simplicity. In three dimensions, the Jacobean J becomes very large for typical data sets which will make solving equation 2 or storing Jacobian J difficult.

A model update $\Delta m=\alpha p$ is calculated at each iteration. If the problem is linear, then the model update to be applied is exactly $\Delta m=p$ because $\alpha=1$. For non-linear problems, the Jacobian J represents a linear approximation of the modeling operator. Because this approximation is not exact, it is better to use a model update $\Delta m=\alpha p$, where $\alpha$ is a scalar. The search is carried out along the direction given by p, and scalar $\alpha$ states how long in that direction the update should go. The optimal value of $\alpha$, which can be very different from 1 in non-linear cases, can be searched for by techniques usually referred to as line search.

Line search requires some modelings/simulations and some iterations to finally find a good value for $\alpha$ but these "internal" iterations are simpler and more rapid than the general iterations. After that step, the model update is calculated and we obtain an improved model m+$\Delta$m, so the cost function is smaller for m+$\Delta$m than it was form.

The model vector can be reduced in size by applying model compression. An interpolator R can be used to compress the size of vector m to a reduced number of parameters $N_c$. The relationship between a compressed vector $\tilde{m}$ containing $N_c$ parameters and vector m is (equation 4)

$m=R\tilde{m}$ whereby $N_c \ll N$. The ratio $N/N_c$ is the parameter compression factor. The inventors have appreciated that the interpolator can be varied during the inversion process to combine a reduction in complexity with an increased resolution of the final estimate.

In compressed model space, the Jacobian becomes (equation 5)

$$\tilde{J} = \frac{\partial d}{\partial \tilde{m}} = \left(\frac{\partial d}{\partial m}\right)\left(\frac{\partial m}{\partial \tilde{m}}\right) = JR$$

and the compressed gradient $\tilde{g}$ can be obtained from $\tilde{J}$ with equations similar to equation 3. A new set of much smaller equations than equation 2 can now be solved to obtain a compressed search direction $\tilde{p}$ and to obtain a compressed model update $\Delta \tilde{m}=\alpha \tilde{p}$, where $\alpha$ is optimised by line search.

The model vector at iteration k is $m_k=R\tilde{m}_k$, depends on $N_c$ free parameters only. Model $m_k$ still contains N different values, but the free parameters are reduced. The inversion can therefore be carried out more quickly. However, the final model will at best have a resolution related to the properties of the interpolator which typically has a low spatial resolution if $N_c$ is small. This limit to the resolution will also limit the degree of compression which can be used while retaining a meaningful output of the inversion algorithm.

By way of illustration, noise-free synthetic CSEM data have been generated with finite difference methods, whereby the data were simulated to be recorded by 10 receivers located on the seabed with 1 km spacing. Gauss-Newton inversion was applied to the recorded data at frequencies of the electric field of 0.1, 0.25, 0.5, 1 and 2 Hz. For each frequency, the data were muted at the offset where they reached $10^{-15}$ V/Am$^2$. FIG. 1 illustrates the resistivity of the formation and FIG. 2 illustrates the outcome of the inversion without using compression. In this synthetic system, it is possible to avoid using compression because the problem involves only two spatial dimensions, but it is not possible to avoid using compression in most three-dimensional inversion problems real data because of the size of the model vector m. The grid has vertical discretisation of 50 m and horizontal discretisation of 100 m. The depth of the formation is 4 km while the horizontal distance of the formation is 20 km. Resistive anomalies in the formation, which are indicative of the presence of hydrocarbons, are indicated by vertical black lines. The outcome of the inversion, as illustrated in FIG. 2, correctly identifies the anomalies in the formation.

FIG. 3 illustrates the outcome of the inversion when a compression factor of 4 is used. The grid on which the inversion is carried out is illustrated in FIG. 4. The compression factor of 4 is achieved by reducing the resolution of both the horizontal discretisation and the vertical discretisation by 2. As can be seen in FIG. 3, the outcome of the inversion has the same compressed resolution as the grid itself shown in FIG. 4. The black region at the top of FIG. 4 is a water layer where the model is not updated. FIG. 3 still correctly identifies the anomalies in the formation, despite the compression.

FIG. 5 illustrated the outcome of the inversion when a compression factor of 132 is used, achieved by reducing the resolution in the horizontal direction by 22 and reducing the resolution in the vertical direction by 6. FIG. 6 illustrates the grid on which the inversion is carried out. FIG. 5 shows how the resolution of the inversion outcome is the same as the resolution of the grid shown in FIG. 6. FIG. 5 also shows how the anomalies in the formation are not identified correctly anymore, so the inversion results are not reliable, besides the reduced resolution.

The inventors have appreciated that the computational advantages of a low resolution grid can be combined with a higher resolution inversion outcome if the compression is varied each time new values for the free parameters are chosen, which is also referred to as the model being updated. The operator R can be changed at each iteration while keeping the same degree of compression. The operator R may be changed randomly or at equal increments at each iteration. At iteration k, the inverted model of the conductivity vector $m_k$ on the full resolution grid relates to the conductivity vector $\tilde{m}_k$ as (equation 6)

$$m_k = m_1 + \sum_{i=1}^{k-1} R_k \Delta \tilde{m}_k$$

which no longer has the form of equation 4 discussed before. The summation of the plurality of modified conductivity vectors increases the resolution of the grid.

The process of shifting the grid, as varying operator R can be referred to, is illustrated in FIGS. 7 A, B and C. In FIG. 7A, a first spatial grid of depth versus distance is illustrated on which conductivity model $m_2$ is defined. In FIG. 7B, changes of the physical parameters illustrated as $\Delta m_2 = R_2 \Delta \tilde{m}_2$ is done on a different grid, shifted with respect to the first grid: the first grid corresponds to an interpolation operator $R_1$ while the second grid is corresponds to an interpolation operator $R_2$ different from $R_1$. In FIG. 7C, the next iteration of conductivity model $m_3$ is illustrated as $m_3 = m_2 + \Delta m_2$. If we assume that the initial model $m_1$ is homogeneous, then $m_2 = m_1 + R_1 \Delta \tilde{m}_1$ has the same resolution as the first compressed grid but the resolution is increased at the second iteration because $R_2 \neq R_1$ and during the iterative inversion process resolution is built up. The updated model cannot be described anymore by the compressed number of free parameters $N_c$, as in the example of FIGS. 5 and 6 for example.

FIGS. 8 and 9 illustrate the final resistivity models obtained by the method of varying the interpolation operator. The compression factor in FIGS. 8 and 9 is 132, obtained by a compression of 22 in the horizontal direction and a compression of 6 in the vertical, depth, direction. In FIG. 8, the model updates at any iteration were constant in each cell of the compressed grid, like in the method of FIGS. 3 to 6. Moreover, the model update is equal for all the fine grid cells pertaining to the same large cell of the compressed grid. The different grids used during the iterative process are visible. In FIG. 9, the different grids are not visible anymore. The difference between the method used in FIG. 8 and the method used in FIG. 9 is the type of interpolation operator R that is used, i.e. the type of relationship between the compressed set of physical parameters $\tilde{m}$ and the physical parameters m defined on the 'full' grid. In FIG. 8, the relationship between the compressed model update $\Delta \tilde{m}_2$ (defined on the compressed grid containing large cells) and the model update $m_2 = R_2 \Delta \tilde{m}_2$ (defined on the grid containing small cells) is such that the model update is equal for all the small cells pertaining to the same large cell of the compressed grid. This means that operator $R_k$ is a nearest-neighbour interpolator between nodes located at the centers of the large cells of the $k^{th}$ compression grid. In FIG. 9, interpolators are used which are smoother than nearest-neighbour interpolators. On could also first use nearest-neighbour interpolation, followed by smoothing the obtained result.

The results, as illustrated in FIGS. 8 and 9, are a correct identification of the anomalies in the formation. The results are not too dissimilar from the 'full' model inversion illustrated in FIG. 2, while a compression factor of 132 is used. The full model inversion is not an option for real CSEM data sets and compression combined with the varying grids disclosed herein provides a feasible method for achieving accurate estimations of the conductivity of a formation. When comparing the results of FIGS. 8 and 9 with the results of FIG. 5, it is noted that the method of FIG. 5 is not useful because the results are very poor. However, the numerical cost of the method of FIGS. 8 and 9 is similar to the result of FIG. 5.

FIG. 10 illustrates the RMS error between the CSEM data and the simulated data based on the estimated resistivity. The vertical axis shows the error and the horizontal axis shows the number of iterations of the inversion. The error decreases when the number of iterations increases for all of the methods. The worst performing method with the largest final error is the method which uses a compression factor of 132 without varying the grid. The model vector which uses a compression factor of 132 and additionally varies the grid has a final error which is much better than the worst performing method. A further improvement can be achieved using also smoothing in the interpolation. Weak compression with a factor of 4 again performs better, while the 'full' model vector without any compression performs best.

The methods described herein by way of example concern non-linear inversion of CSEM data, but the claimed invention can also be applied to other methods. For example, non-linear inversion of other types of geophysical data, like magnetotelluric data, seismic data, and acoustic data acquired in boreholes and Ground Penetrating Radar data. For seismic data, an application of the invention is to so-called Full Waveform Inversion. The method can also be applied to joint-inversions where several types of data are used simultaneously.

Some common earth properties that can be inverted from geophysical data are inverted for include acoustic velocity, formation and fluid densities, acoustic impedance, Poisson's ratio, formation compressibility, shear rigidity, porosity, and fluid saturation.

Deterministic inversion methods are based on comparison of the output from an earth model with the observed field data and continuously updating the earth model parameters to minimize a function, which is usually some form of difference between model output and field observation. The set of model parameters that minimizes the objective function will produce a numerical seismogram which best compares with collected field seismic data. The step of updating is also carried out on a grid which can be varied between iterations. Stochastic inversion methods can also be used to generate constrained models as used in reservoir flow simulation, using geostatistical tools like kriging. As opposed to deterministic inversion methods, which produce a single set of model parameters, stochastic methods generate a suite of alternate earth model parameters which all obey the model constraint.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of estimating a set of physical parameters aligned with a grid so as to provide a model of a region of the Earth's subsurface, the method comprising:
    iteratively inverting an equation to minimise a penalty term depending on:
        a) simulated data obtained using a model vector representing the set of physical parameters with a set of variables; and
        b) measured data
    and to provide an estimated set of physical parameters, wherein said iteratively inverting comprises at least a first inversion step and a second inversion step and at each step the model vector is updated by determining the set of variables which minimises a penalty term depending on simulated data generated with the updated model vector and measured data;
    at each inversion step, applying a compression operator to the model vector to reduce the number of free variables to a number less than the total number of variables within said set of variables and to thereby produce a compressed model vector;
    varying the compression operator between the first inversion step and the second inversion step in order to change the free variables between the first inversion step and the second inversion step, by shifting the grid between the first and second inversion steps without changing the resolution of the grid; and
    calculating a combination of a compressed model vector obtained in the first inversion step and a compressed model vector obtained in the second inversion step.

2. The method of claim 1, wherein the model vector is defined on said grid and wherein the compression operator reduces the number of free parameters defined on the grid.

3. The method of claim 2, wherein said compression operator is a nearest-neighbour interpolator arranged to interpolate the value of the physical parameters on neighbouring cells of the grid.

4. The method of claim 3, further comprising smoothing the interpolated values.

5. The method of claim 2, wherein the grid is uniform or non-uniform.

6. The method of claim 2, wherein the physical parameters relate to a formation and wherein the grid depends on prior knowledge of the formation.

7. The method of claim 1, wherein said inverting is based on one of: a Gauss-Newton method, an OCCAM algorithm, a Levenberg-Marquardt algorithm, a quasi-Newton algorithm or a gradient-base algorithm.

8. The method of claim 1, wherein said measured data are CSEM data or seismic data.

9. The method of claim 1, wherein the penalty term is one of:
    the error between the simulated data and the measured data,
    a cost function depending on the simulated data and the measured data,
    the sum or the product of (i) the error between the simulated data and the measured data and (ii) the simulated data weighted according to a predetermined preference.

10. A computer system arranged to carry out the method of claim 1.

11. Computer software installed on a non-transitory computer readable medium of a computer system and arranged to cause the computer system to carry out the method of claim 1.

* * * * *